United States Patent
Thomas et al.

(10) Patent No.: US 11,073,026 B1
(45) Date of Patent: Jul. 27, 2021

(54) TURBINE SHROUD ASSEMBLY WITH MULTI-PIECE SUPPORT FOR CERAMIC MATRIX COMPOSITE MATERIAL SEAL SEGMENTS

(71) Applicant: Rolls-Royce Corporation, Indianapolis, IN (US)

(72) Inventors: David J. Thomas, Brownsburg, IN (US); Jeffrey A. Walston, Indianapolis, IN (US); Aaron D. Sippel, Zionsville, IN (US); Daniel K. Vetters, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 13 days.

(21) Appl. No.: 16/745,977

(22) Filed: Jan. 17, 2020

(51) Int. Cl.
*F01D 11/08* (2006.01)
*F01D 5/22* (2006.01)
*F01D 25/24* (2006.01)

(52) U.S. Cl.
CPC .............. *F01D 5/225* (2013.01); *F01D 11/08* (2013.01); *F01D 25/246* (2013.01); *F05D 2220/323* (2013.01); *F05D 2230/60* (2013.01); *F05D 2240/11* (2013.01); *F05D 2250/75* (2013.01); *F05D 2260/36* (2013.01); *F05D 2300/10* (2013.01); *F05D 2300/6033* (2013.01)

(58) Field of Classification Search
CPC ........ F01D 11/08; F01D 25/005; F01D 25/24; F01D 25/246; F05D 2220/32; F05D 2240/11; F05D 2250/75
See application file for complete search history.

(56) References Cited

U.S. PATENT DOCUMENTS

| | | |
|---|---|---|
| 8,647,055 B2 | 2/2014 | Foster et al. |
| 8,740,552 B2 | 6/2014 | Marusko et al. |
| 8,753,073 B2 | 6/2014 | Albers et al. |
| 8,790,067 B2 | 7/2014 | McCaffrey et al. |
| 8,834,105 B2 | 9/2014 | Albers et al. |
| 8,905,709 B2 | 12/2014 | Dziech et al. |
| 9,127,569 B2 | 9/2015 | Akiyama et al. |
| 9,175,579 B2 | 11/2015 | Franks et al. |
| 9,726,043 B2 | 8/2017 | Franks et al. |
| 10,087,784 B2 | 10/2018 | Shapiro et al. |
| 10,196,919 B2 | 2/2019 | O'Leary et al. |
| 2016/0097303 A1 | 4/2016 | Baldiga et al. |
| 2016/0333715 A1 | 11/2016 | McCaffrey |
| 2017/0101882 A1* | 4/2017 | Sippel .................. F01D 11/005 |
| 2017/0130600 A1 | 5/2017 | Shapiro et al. |
| 2018/0106160 A1 | 4/2018 | Thomas et al. |
| 2018/0149030 A1 | 5/2018 | Freeman et al. |
| 2018/0149041 A1* | 5/2018 | Freeman ............... F01D 25/246 |
| 2018/0149042 A1 | 5/2018 | Freeman et al. |
| 2019/0107001 A1 | 4/2019 | Crutchfield |
| 2019/0107002 A1 | 4/2019 | Crutchfield |

* cited by examiner

*Primary Examiner* — Woody A Lee, Jr.
*Assistant Examiner* — Maxime M Adjagbe
(74) *Attorney, Agent, or Firm* — Barnes & Thornburg LLP

(57) ABSTRACT

An assembly adapted for use in a gas turbine engine or other engine has a carrier component and a blade track segment. The assembly includes a mounting system for coupling the blade track segment to the carrier component. In an illustrative embodiment, the assembly is a turbine shroud segment for blocking gasses from passing over turbine blades included in the gas turbine engine.

20 Claims, 3 Drawing Sheets

TURBINE SHROUD ASSEMBLY WITH MULTI-PIECE SUPPORT FOR CERAMIC MATRIX COMPOSITE MATERIAL SEAL SEGMENTS

FIELD OF THE DISCLOSURE

The present disclosure relates generally to gas turbine engines, and more specifically to subassemblies of gas turbine engines including ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies.

Some shrouds positioned in the turbine may be exposed to high temperatures from products of the combustion reaction in the combustor. Such shrouds sometimes include blade track components made from ceramic matrix composite materials designed to withstand high temperatures. In some examples, coupling ceramic matrix composite components with traditional fasteners such as rivets or bolts may present problems due to thermal expansion and/or material properties of the ceramic matrix composite components.

SUMMARY

The present disclosure may comprise one or more of the following features and combinations thereof.

A turbine shroud segment adapted for use in a gas turbine engine may include a carrier segment, a blade track segment, and a mounting system. The carrier segment may comprise metallic materials. The blade track segment may comprise ceramic matrix composite materials. The mounting system may be configured to couple the blade track segment to the carrier segment.

In some embodiments, the blade track segment may be formed to include a runner and an attachment. The runner may be shaped to extend partway around a central axis. The attachment may extend radially outward from the runner.

In some embodiments, the mounting system may include a brace, a first clamp, and a second clamp. The brace may be formed to include a bracket and a plurality of shafts. The bracket may extend at least partway about the central axis and engage a radially-outwardly facing surface of the attachment of the blade track segment. The plurality of shafts may extend from the bracket through the carrier segment to couple the blade track segment to the carrier segment.

In some embodiments, the first clamp may extend around and engage the bracket of the brace and the attachment of the blade track segment to couple the blade track segment to the brace. The second clamp may extend around and engage the bracket of the brace and the attachment of the blade track segment opposite the first clamp to couple the blade track segment to the brace.

In some embodiments, the bracket may include a plurality of locating pads. The plurality of locating pads may each extend radially outward from the bracket into contact with a radially-inwardly facing surface of the carrier segment. The plurality of locating pads may contact the radially-inwardly facing surface of the carrier segment to radially locate the blade track segment.

In some embodiments, the mounting system may include a plurality of first clamps and a plurality of second clamps. The plurality of locating pads may be spaced apart circumferentially from one another about the central axis between adjacent first clamps and second clamps.

In some embodiments, the plurality of locating pads may include at least three locating pads. In some embodiments, the first clamp and the second clamp may be interference fit with the bracket of the brace and the attachment of the blade track segment.

In some embodiments, the attachment of the blade track segment may have a T-shape when viewed in a circumferential direction with a stem and an attachment panel. The stem may extend radially outward from the runner. The attachment panel may extend axially forward and aft from the stem such that the entire blade track segment has a generally I-beam shape when viewed in the circumferential direction. In some embodiments, the first clamp and the second clamp may each form a C-shape when viewed in cross-section about the central axis.

In some embodiments, each of the first clamp and the second clamp may include a first radial-stop panel, an axial-stop panel, and a second radial-stop panel. The first radial-stop panel may be positioned radially outward of the bracket. The axial-stop panel may extend radially-inwardly from the first radial-stop panel. The second radial-stop panel may extend axially from the corresponding axial-stop panel opposite the first radial-stop panel.

In some embodiments, each of the first clamp and the second clamp may further include at least one engagement pad. The engagement pad may extend radially away from one of the first radial-stop panel and the second radial-stop panel and engage the attachment of the blade track segment.

In some embodiments, each of the first clamp and the second clamp may include two engagement pads. The two engagement pads may include a first engagement pad and a second engagement pad. The first engagement pad may extend radially inward from the first radial-stop panel and engage the bracket of the brace. The second engagement pad may extend radially outward from the second radial-stop panel and engage the attachment panel of the blade track segment.

According to another aspect of the present disclosure, a turbine shroud segment adapted for use in a gas turbine engine may include a carrier segment, a blade track segment, and a mounting system. The mounting system may include a brace and a plurality of clamps that are configured to couple the blade track segment to the carrier segment.

In some embodiments, the blade track segment may include a runner and an attachment. The runner may be shaped to extend partway around a central axis. The attachment may extend radially outward from the runner.

In some embodiments, the brace may be formed to include a bracket and a plurality of shafts. The bracket may extend at least partway about the central axis and engage a radially-outwardly facing surface of the attachment of the blade track segment. The plurality of shafts may extend from the bracket through the carrier segment to couple the blade track segment to the carrier segment. In some embodiments, the plurality of clamps may extend around and engage the bracket of the brace and the attachment of the blade track segment on opposite sides to couple the blade track segment to the brace.

In some embodiments, the bracket may include a plurality of locating pads. The plurality of locating pads may each extend radially outward from the bracket into contact with a radially-inwardly facing surface of the carrier segment to radially locate the blade track segment.

In some embodiments, the plurality of clamps may include at least one first clamp and at least one second clamp. The first clamp may extend around and engage the bracket of the brace and the attachment of the blade track segment to couple the blade track segment to the brace. The second clamp may extend around and engage the bracket of the brace and the attachment of the blade track segment opposite the at least one first clamp.

In some embodiments, the mounting system may include a plurality of first clamps and a plurality of second clamps. The plurality of locating pads may be spaced apart circumferentially from one another about the central axis between adjacent first clamps and second clamps.

In some embodiments, the plurality of locating pads may include at least three locating pads. In some embodiments, the plurality of clamps may be interference fit with the bracket of the brace and the attachment of the blade track segment.

In some embodiments, the attachment of the blade track segment may have a T-shape when viewed in a circumferential direction with a stem and an attachment panel. The stem may extend radially outward from the runner. The attachment panel may extend axially forward and aft from the stem such that the entire blade track segment has a generally I-beam shape when viewed in the circumferential direction. In some embodiments, the plurality of clamps may each form a C-shape when viewed in cross-section about the central axis.

In some embodiments, the plurality of clamps may each include a first radial-stop panel, an axial-stop panel, and a second radial-stop panel. The first radial-stop panel may be positioned radially outward of the bracket. The axial-stop panel may extend radially-inwardly from the first radial-stop panel. The second radial-stop panel may extend axially from the corresponding axial-stop panel opposite the first radial-stop panel.

In some embodiments, the plurality of clamps may each further include engagement pads. The engagement pads may extend radially away from one of the first radial-stop panel and the second radial-stop panel and engage the attachment of the blade track segment.

According to another aspect of the present disclosure, a method may include providing a carrier segment, a blade track segment, and a mounting system. The mounting system may be configured to couple the blade track segment to the carrier segment.

In some embodiments, the blade track segment may include a runner and an attachment. The runner may be shaped to extend partway around a central axis. The attachment may extend radially outward from the runner.

In some embodiments, the mounting system may include a brace, a first clamp, and a second clamp. The brace may have a bracket and a plurality of shafts. The plurality of shafts may extend radially from the bracket.

In some embodiments, the method may further include engaging the bracket of the brace with a radially-outwardly facing surface of the attachment. The bracket of the brace may be engaged with the radially-outwardly facing surface of the attachment so that the plurality of shafts extend radially away from the attachment of the blade track segment.

In some embodiments, the method may further include coupling the first clamp with the bracket of the brace and the attachment of the blade track segment on a first side of the bracket and coupling the second clamp with the bracket of the brace and the attachment of the blade track segment on a second side of the bracket opposite the first side. The first clamp and second clamp may be coupled to the brace and the attachment to fix the blade track segment with the brace.

In some embodiments, the method may further include inserting each of the plurality of shafts through holes formed in the carrier segment and coupling the plurality of shafts to the carrier segment. The plurality of shafts may be coupled to the carrier segment to engage locating pads formed on the bracket of the brace with a radially-inwardly facing surface of the carrier segment so that the locating pads radially locate the blade track segment. In some embodiments, the first clamp and the second clamp may be interference fit with the bracket of the brace and the attachment of the blade track segment.

These and other features of the present disclosure will become more apparent from the following description of the illustrative embodiments.

DETAILED DESCRIPTION OF THE DRAWINGS

Figure 1:
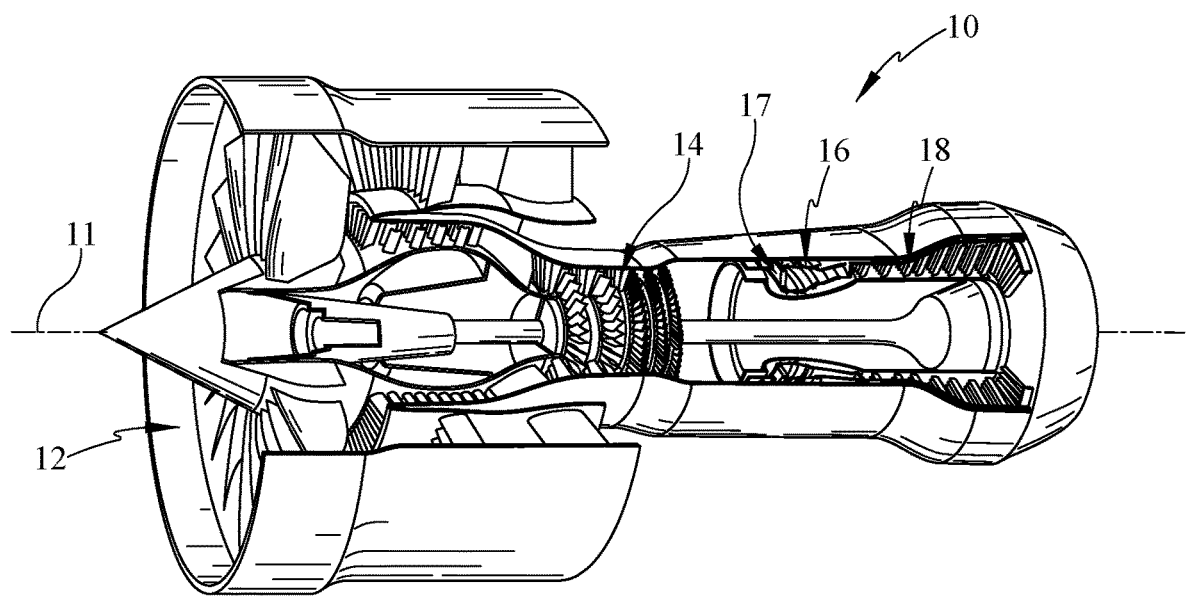
FIG. 1 is a cut-away perspective view of a gas turbine engine showing that the exemplary engine includes a fan driven by an engine core having a compressor, a combustor, and a turbine.

For the purposes of promoting an understanding of the principles of the disclosure, reference will now be made to a number of illustrative embodiments illustrated in the drawings and specific language will be used to describe the same.

Figure 2:
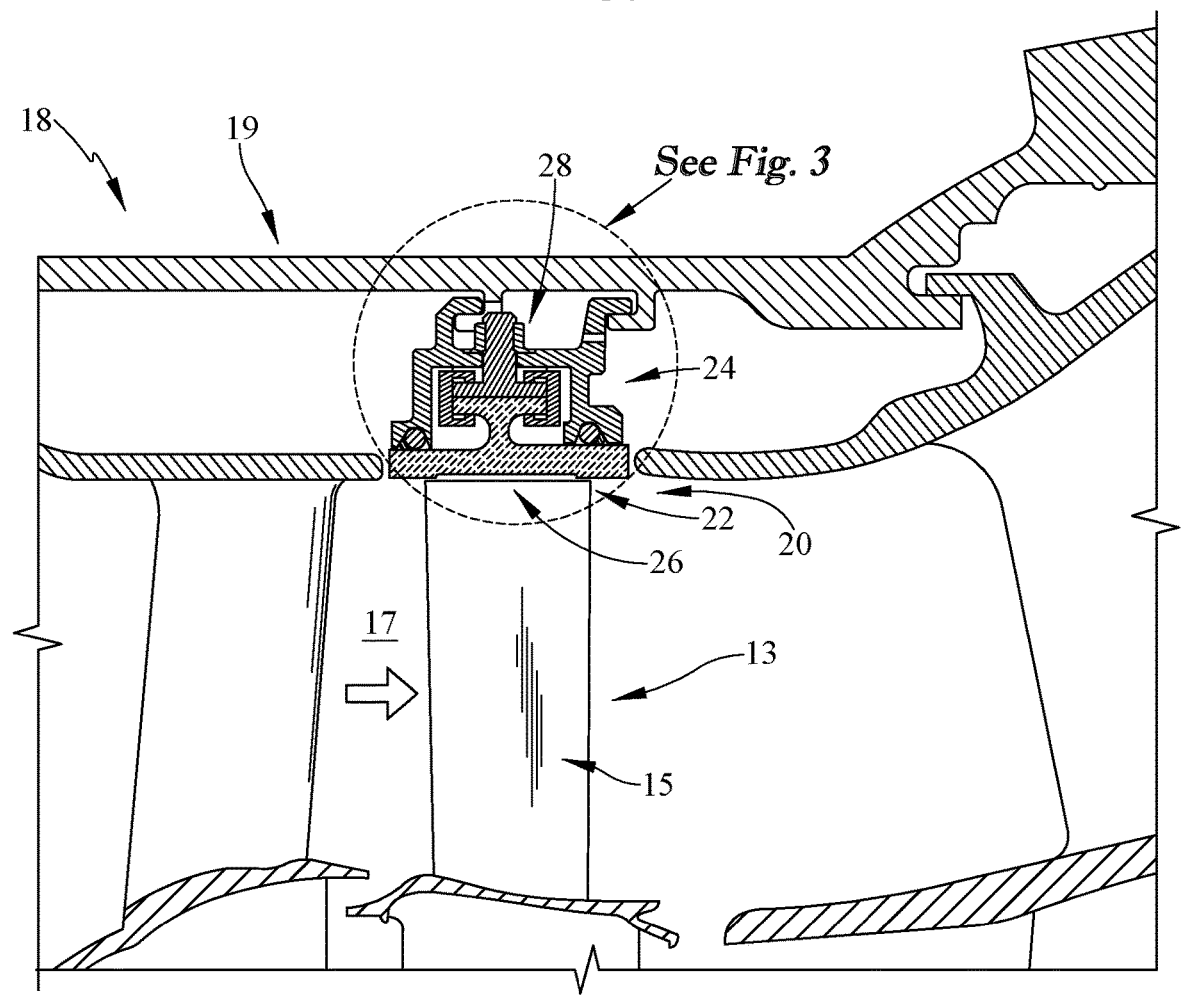
FIG. 2 is a partial cross-sectional view of the gas turbine engine of FIG. 1 showing the arrangement of a segmented turbine shroud radially outward from blades of a turbine wheel assembly to suggest that the turbine shroud blocks gasses from passing over the blades without interacting with the blades.
Figure 3:
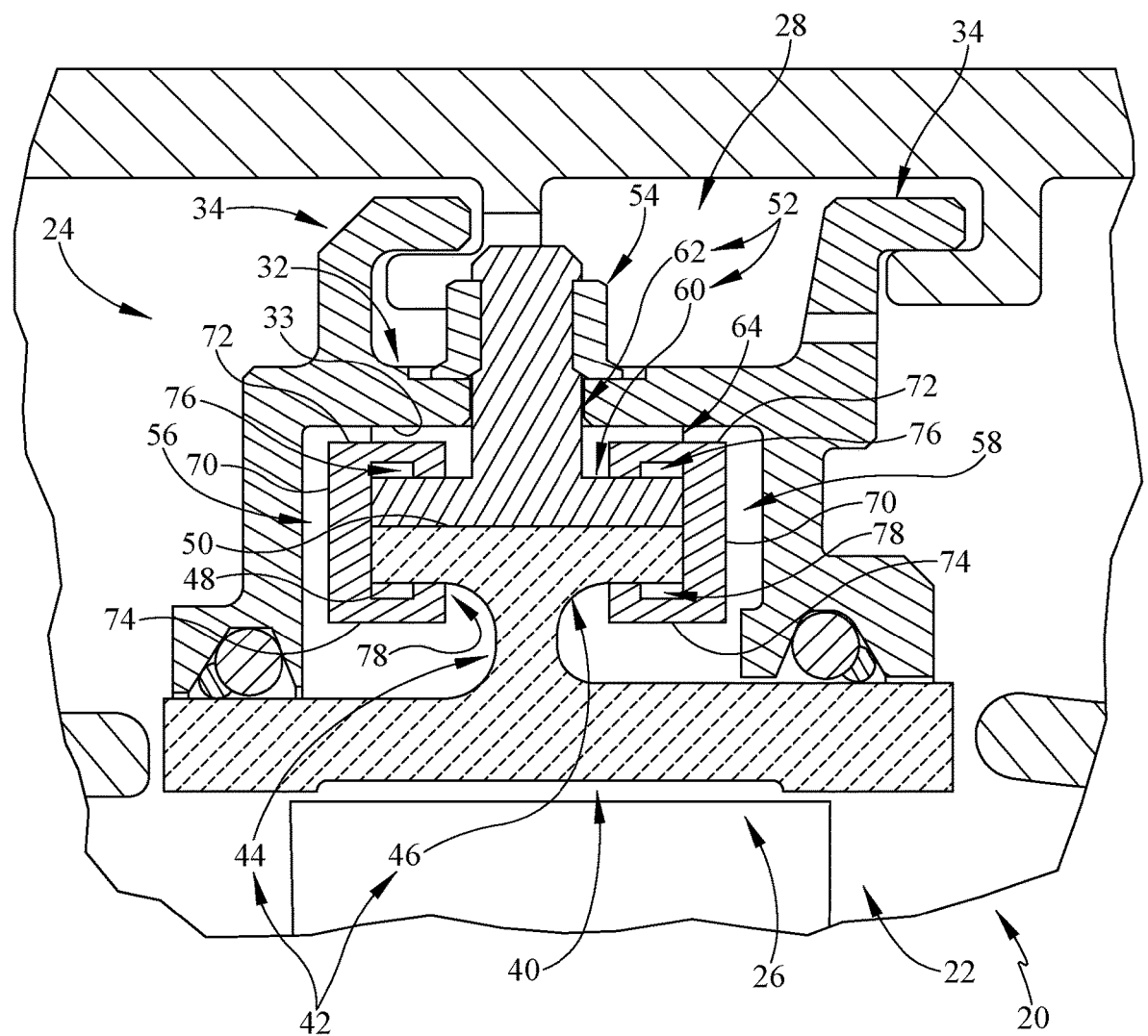
FIG. 3 is a detail view of a portion of FIG. 2 showing a turbine shroud segment that includes a carrier segment, a blade track segment made from ceramic matrix composite materials, and a mounting system for coupling the blade track segment to the carrier segment.
Figure 4:
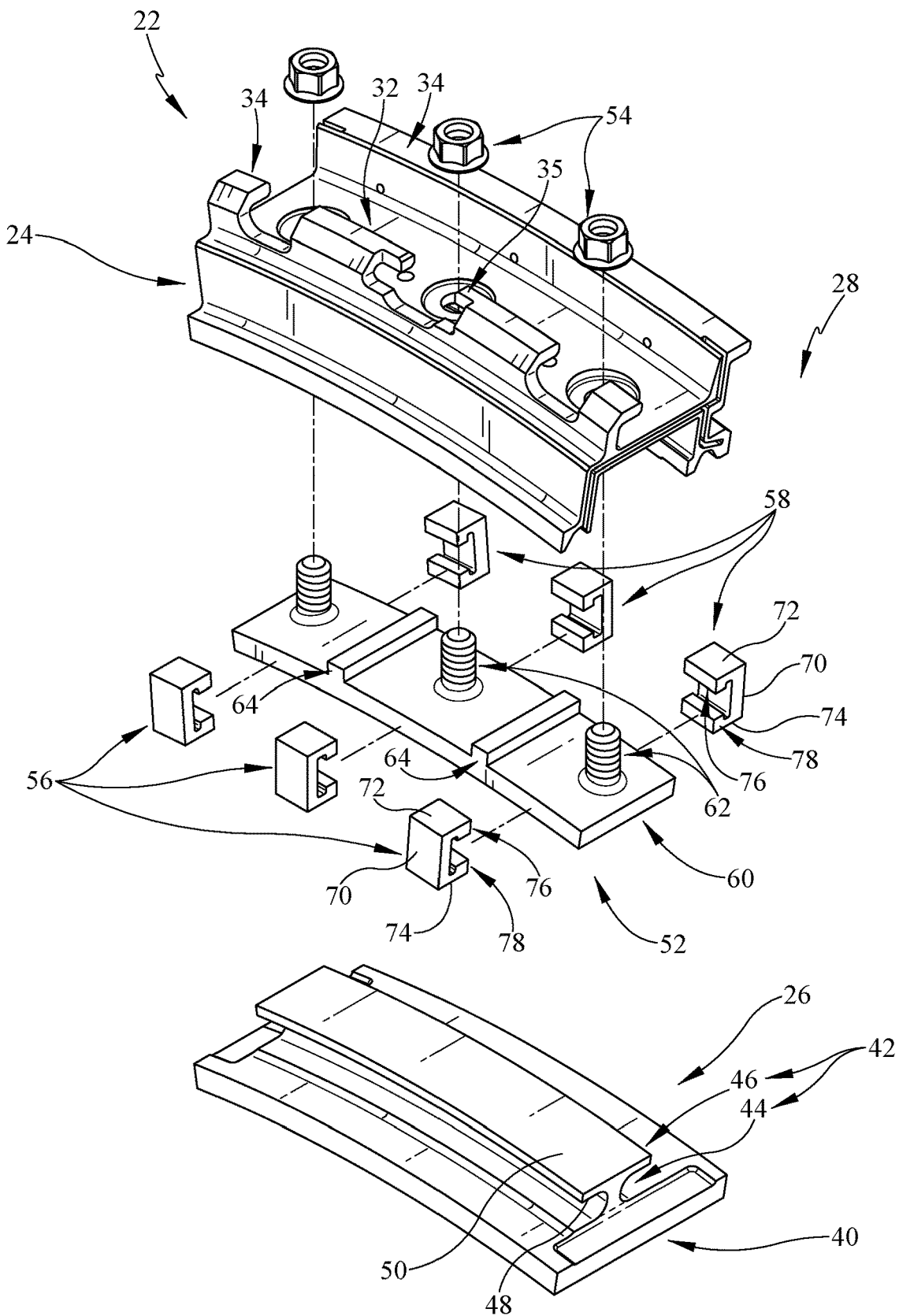
FIG. 4 is an exploded view of the turbine shroud segment of FIG. 3 showing the mounting system is provided by a multi-piece support with C-clamps for holding the blade track segment relative to the carrier segment.

A turbine shroud 20 adapted for use in a gas turbine engine 10 is shown in FIGS. 2 and 4. The turbine shroud 20 includes a carrier segment 24, a blade track segment 26, and a mounting system 28 configured to couple the blade track segment 26 to the carrier segment 24 as shown in FIGS. 2-4. The carrier segment 24 is a metallic support component configured to interface with other metallic components of the gas turbine engine 10. The blade track segment 26 is a ceramic matrix composite component configured to directly face the high temperatures of a primary gas path 17 of the gas turbine engine 10. The mounting system 28 is designed to engage the blade track segment 26 so as to couple the blade track segment 26 to the carrier segment 24 and distribute mounting and pressure loads.

The mounting system 28 includes a brace 52 along with corresponding nuts 54 and a plurality of clamps 56, 58 as shown in FIGS. 3 and 4. The brace 52 is configured to distribute coupling and pressure loads applied to the blade track segment 26. The nuts 54 are threaded in the illustrative embodiment and engage the brace 52 to fix the brace 52 in place and to apply coupling load to the blade track segment 26 through the brace 52. Each of the clamps 56, 58 engages the brace 52 and the blade track segment 26 on opposite sides of an attachment portion 42 of the blade track segment 26 to couple the blade track segment 26 to the brace 52.

Adjustable attachment arrangements, such as a bolted hanger system, may help accommodate the poor surface tolerance of the "as formed" blade track segment 26. The clamps 56, 58 comprising metallic materials, provide multiple contact points on the blade track segment 26 to reduce mechanical stresses in the blade track segment 26. The clamps 56, 58 may eliminate any face machining needed on the blade track segment 26.

The brace 52 includes a bracket 60, attachment shafts 62, and a plurality of locating pads 64 as shown in FIGS. 2 and 3. The bracket 60 extends at least partway about the axis 11 and engages the blade track segment 26. The shafts 62 of the brace 52 extend from the bracket 60 through the carrier segment 24 into a corresponding retaining nut 54. In the illustrative embodiment, the plurality of shafts 62 are threaded and mate with threads of the retaining nuts 54. In other embodiments, the shafts 62 may not be threaded and may instead be engaged by a C-ring to couple the brace 52 to the carrier segment 24. The locating pads 64 extend radially outward from the bracket 60 and engage a radially-inwardly facing surface 33 of the carrier segment 24.

The locating pads 64 engage the radially-inwardly facing surface 33 of the carrier 24 to help locate the blade track segment 26 relative to the carrier segment 24. The locating pads 36 may be machined on the bracket 60 to help place the blade track segment 26 in a desired orientation relative to the carrier segment 24. In the illustrative embodiment, the locating pads 64 extend axially entirely across the bracket 60.

In other embodiments, the locating pads 64 may be discrete features that extend from opposite sides of the bracket 60. In some embodiments, the locating pads 64 may be discrete features axially and circumferentially spaced apart along the bracket 60. In other embodiments, the locating pads 64 may extend radially inward from the radially-inwardly facing surface 33 of the carrier 24 and engage the bracket 60.

Turning again to the gas turbine engine, the illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12.

The turbine 18 includes at least one turbine wheel assembly 13 and the turbine shroud 20 positioned to surround the turbine wheel assembly 13 as shown in FIGS. 1 and 2. The turbine shroud 20 is coupled to an outer case 19 of the gas turbine engine 10. The turbine wheel assembly 13 includes a plurality of blades 15 coupled to a rotor disk for rotation therewith. The hot, high pressure combustion products from the combustor 16 are directed toward the blades 15 of the turbine wheel assemblies 13 along the gas path 17. The blades 15 are in turn pushed by the combustion products to cause the turbine wheel assembly 13 to rotate; thereby, driving the rotating components of the compressor 14 and/or the fan 12.

The turbine shroud 20 extends around the turbine wheel assembly 13 to block combustion products from passing over the blades 15 without pushing the blades 15 to rotate as suggested in FIG. 2. In the illustrative embodiment, the turbine shroud 20 is made up of a number of shroud segments 22, one of which is shown in FIGS. 3 and 4, that extend only part-way around the central axis 11 and cooperate to surround the turbine wheel assembly 13. The shroud segments 22 are sealed against one another, such as by strip seal members, to provide a continuous turbine shroud 20.

Each shroud segment 22 includes the carrier segment 24, the blade track segment 26, and the mounting system 28 as shown in FIGS. 2-4. In other embodiments, the turbine shroud 20 is annular and non-segmented to extend fully around the central axis 11 and surround the turbine wheel assembly 13. In yet other embodiments, certain components of the turbine shroud 20 are segmented while other components are annular and non-segmented.

The carrier segment 24 included in each shroud segment 22 is coupled to the case 19 of the engine 10 as shown in FIG. 2. Each carrier segment 24 illustratively includes a body plate 32 and hangers 34 as shown in FIG. 3. The body plate 32 extends partway around the axis 11 and is formed to include holes 35 through which the mounting system 28 extends. The hangers 34 extend radially outward from the body plate 32 and engage the case 19 to couple the turbine shroud segment 22 to the rest of the engine 10. In the illustrative embodiment, the carrier 24 is segmented, while in other embodiments, the carrier 24 may be a full hoop and extend about the axis 11.

The blade tracks segment 26 of each shroud segment 22 comprises ceramic matrix composite materials as suggested in FIGS. 2 and 3. The blade track segment 26 is held in place adjacent to tips of blades 15 to block combustion products from passing over the blades 15 without pushing the blades 15 to rotate. The blade track segment 26 is illustratively formed to include a runner 40 and the attachment portion 42 as shown in FIGS. 3 and 4. The runner 40 is arcuate and extends partway around axis 11 adjacent to blades 15. The attachment portion 42 extends radially outward from the runner 40 to provide structure for coupling the blade track segment 26 to the carrier segment 24.

In the illustrative embodiment, the attachment portion 42 of the blade track segment 26 has a T-shape when viewed in the circumferential direction as such that the entire blade track segment has a generally I-beam shape when viewed in the circumferential direction shown in FIGS. 3 and 4. The attachment portion (or attachment) 42 includes a stem 44 that extends radially outward from the runner 40 and an attachment panel 46 that extends radially forward and aft from the stem 44. In other embodiments, the attachment 42 may be provided by L-shaped hangers, fir-tree shaped members, dovetail members, box shape panels, or other suitable features.

Turning again to the mounting system 28, the first clamp 56 is located primarily forward of the attachment 42 included in the blade track segment 26 and the second clamp 58 is located primarily aft of the attachment 42 included in the blade track segment 26 as shown in FIG. 3. The bracket 60 extends axially between the first and the second clamps 56, 58 at a point radially outward of the attachment 42. In other embodiments, the clamps 56, 58 may be arranged primarily on circumferentially different sides of the attachment 42.

In view of this, the first clamp 56 and the second clamp 58 each form a C-shape when viewed in cross-section around the axis 11 as shown in FIGS. 3 and 4. The C-shape of the clamps 56, 58 extend around the attachment panel 46 of the blade track segment 26 and the bracket 60 of the brace 52. In the illustrative embodiment, the clamps 56, 58 are interference fit with the attachment 42 and the bracket 60 to couple the blade track segment 26 to the bracket 60.

Each of the first clamp 56 and the second clamp 58 include an axial-stop panel 70, a first radial-stop panel 72, and a second radial-stop panel 74 as shown in FIGS. 3 and 4. The axial-stop panel 70 is arranged to block axial movement of an attachment panel 46 of the blade track segment 26 and the bracket 60 and axially locate the blade track segment 26. The first radial-stop panel 72 and the second radial-stop panel 74 extend axially from opposite ends of the corresponding axial-stop panel 70 to form the C-shape cross-section shape of the clamps 56, 58 when viewed in cross-section around the axis 11.

In the illustrative embodiment, the first radial-stop panel 72 extends axially from the corresponding axial-stop panel 70 at a location radially outward of the bracket 60. The second radial-stop panel 74 extends axially from the corresponding axial-stop panel 70 at a location radially inward of the attachment panel 46 of the blade track segment 26.

Each of the clamps 56, 58 also include engagement pads 76 as shown in FIGS. 3 and 4. The engagement pads 76 extend radially away from corresponding radial-stop panels 72, 74 and into contact with one of the radially-inwardly facing surface 48 and the radially-outwardly facing surface 50 of the attachment panel 46 of the attachment 42 included in the blade track segment 26. The engagement pads 76 provide a plurality of contact points to reduce mechanical stress in the blade track segment 26, while also minimizing rigid body movement.

In the illustrative embodiment, the clamps 56, 58 are spaced apart circumferentially about the axis 11 as shown in FIG. 4. The locating pads 64 are spaced circumferentially between adjacent shafts 62. Each of the clamps 56, 58 are axially aligned with the shafts 62 in the illustrative embodiment.

A method of assembling the turbine shroud segment 22 may include several steps. The method includes arranging the radially-outwardly facing surface 50 into contact with the bracket 60 so that the shafts 62 extend radially away from the attachment panel 46. Then, the first clamp 56 is coupled to the attachment panel 46 and the bracket 60 on one side and the second clamp 58 is coupled to the attachment panel 46 and the bracket 60 on the opposite side.

The first and second clamps 56, 58 are coupled to the attachment panel 46 and the bracket 60 by arranging the C-shaped clamps around the attachment panel 46 and bracket 60. In the illustrative embodiment, the clamps 56, 58 are interference fit with the attachment panel 46 and bracket 60 so that the attachment panel 46 and bracket 60 are clamped together, blocking radial and axial movement of the blade track segment 26 relative to the brace 52.

After the blade track segment 26 is coupled to the brace 52, the method further includes arranging the shafts 62 to extend through the carrier 24 and coupling each of the retaining nuts 54 to each corresponding shaft 62. The retaining nuts 54 are then tightened to pull the locating pads 36 formed in the bracket 60 into engagement with the radially-inwardly facing surface 33 of the carrier 24. After the blade track segment 26 is coupled to the carrier segment 24, the assembled turbine shroud segment 22 is assembled in the engine 10.

Adjustable attachments, such as a bolted hanger system, are herein considered to help accommodate the poor (relative to more conventional turbine engine materials/fabrication processes) surface tolerance of the "as formed" ceramic matrix composite part can have on impacted interfaces in the design stack. Using this technique, control of the final placement of the part is transferred from the poorly controlled surface in a hard to reach area (such as the underside of a hanger) to a more accessible area that can be machined to a more tightly controlled tolerance (such as the outer surface of the same hanger).

As such, the present disclosure teaches a "nesting" arrangement, wherein the carrier segment 24 nests or extends through a portion of the mounting system 28 to engage the blade track segment 26. The nesting arrangement of the carrier segment 24 and the mounting system 28 allows the load path to be centered on the carrier segment 24, avoiding the unwanted rigid body motion, while at the same time minimizing the vertical space claim requirement.

In the illustrative embodiments, the blade track segment 26 is supported with clamps 56 58. The bracket 60 includes the threaded shafts 62 that are fastened to the carrier 24. The bracket 60 is full hoop in the illustrative embodiment. The C-clamps 56, 58 may be interference fit to pull the blade track segment 26 to the bracket 60.

The clamped arrangement may provide a number of points of contact to reduce mechanical stresses in the blade track segment 26. The blade track segment 26 may not need any face machining in the attachment of the I-beam. The backside of the bracket 60 may be machined and used as the locating pads 36 and pulled into contact with the carrier 24.

Embodiments presented herein may also take advantage of modularity to provide engagement pads 76 (sometimes called load pads), as well as the bridging of the supports via the bracket 60 to reduce the unwanted rigid body motion. Moreover, designs in accordance with the present disclosure can create a centered load path with opposing moments to help reduce the tendency of the part to rock.

Concepts in accordance with this disclosure can provide flexibility during assembly. With the modular design of this disclosure, all of the shafts 62 can be assembled with a true radial orientation. The embodiments shown with an I-Beam shaped blade track segment 26 can provide some desired failure characteristics; such as, in the event of a failed post, the bracket 60 itself remains captured by the top flange of the I-Beam and does not move around unconstrained on the backside of the CMC flow path.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud segment adapted for use in a gas turbine engine, the turbine shroud segment comprising a carrier segment comprising metallic materials,
a blade track segment comprising ceramic matrix composite materials, the blade track segment formed to include a runner shaped to extend partway around a central axis and an attachment that extends radially outward from the runner, and
a mounting system configured to couple the blade track segment to the carrier segment, the mounting system including (i) a brace formed to include a bracket that extends at least partway about the central axis and engages a radially-outwardly facing surface of the attachment of the blade track segment and a plurality of shafts that extend from the bracket through the carrier segment to couple the blade track segment to the carrier segment, (ii) a first clamp that extends around and engages the bracket of the brace and the attachment of the blade track segment to couple the blade track segment to the brace, and (iii) a second clamp that extends around and engages the bracket of the brace and the attachment of the blade track segment opposite the first clamp to couple the blade track segment to the brace,
wherein the bracket includes a plurality of locating pads that each extend radially outward from the bracket into contact with a radially-inwardly facing surface of the carrier segment to radially locate the blade track segment.

2. The turbine shroud segment of claim 1, wherein the mounting system includes a plurality of first clamps and a plurality of second clamps and the plurality of locating pads are all spaced apart circumferentially from one another about the central axis between adjacent first clamps and second clamps.

3. The turbine shroud segment of claim 2, wherein the plurality of locating pads includes at least three locating pads.

4. The turbine shroud segment of claim 1, wherein the first clamp and the second clamp are interference fit with the bracket of the brace and the attachment of the blade track segment.

5. The turbine shroud segment of claim 1, wherein the attachment of the blade track segment has a T-shape when viewed in a circumferential direction with a stem that extends radially outward from the runner and an attachment panel that extends axially forward and aft from the stem such that the entire blade track segment has a generally I-beam shape when viewed in the circumferential direction.

6. The turbine shroud segment of claim 5, wherein the first clamp and the second clamp each form a C-shape when viewed in cross-section about the central axis.

7. The turbine shroud segment of claim 5, wherein each of the first clamp and the second clamp each includes a first radial-stop panel positioned radially outward of the bracket, an axial-stop panel that extends radially-inwardly from the first radial-stop panel, and a second radial-stop panel that extends axially from the corresponding axial-stop panel opposite the first radial-stop panel.

8. The turbine shroud segment of claim 7, wherein each of the first clamp and the second clamp further include at least one engagement pad that extends radially away from one of the first radial-stop panel and the second radial-stop panel and engages the attachment of the blade track segment.

9. The turbine shroud segment of claim 8, wherein each of the first clamp and the second clamp each include two engagement pads, the two engagement pads including a first engagement pad that extends radially inward from the first radial-stop panel and engages the bracket of the brace and a second engagement pad that extends radially outward from the second radial-stop panel and engages the attachment panel of the blade track segment.

10. A turbine shroud segment adapted for use in a gas turbine engine, the turbine shroud segment comprising
a carrier segment,
a blade track segment including a runner shaped to extend partway around a central axis and an attachment that extends radially outward from the runner, and
a mounting system including (i) a brace formed to include a bracket that extends at least partway about the central axis and engages a radially-outwardly facing surface of the attachment of the blade track segment and a plurality of shafts that extend from the bracket through the carrier segment to couple the blade track segment to the carrier segment and (ii) a plurality of clamps that extend around and engage the bracket of the brace and the attachment of the blade track segment on opposite sides to couple the blade track segment to the brace,
wherein the bracket includes a plurality of locating pads that each extend radially outward from the bracket into contact with a radially-inwardly facing surface of the carrier segment to radially locate the blade track segment.

11. The turbine shroud segment of claim 10, wherein the plurality of clamps includes at least one first clamp that extends around and engages the bracket of the brace and the attachment of the blade track segment to couple the blade track segment to the brace and at least one second clamp that extends around and engages the bracket of the brace and the attachment of the blade track segment opposite the at least one first clamp.

12. The turbine shroud segment of claim 11, wherein the mounting system includes a plurality of first clamps and a plurality of second clamps and the plurality of locating pads are all spaced apart circumferentially from one another about the central axis between adjacent first clamps and second clamps.

13. The turbine shroud segment of claim 12, wherein the plurality of locating pads includes at least three locating pads.

14. The turbine shroud segment of claim 10, wherein the plurality of clamps are interference fit with the bracket of the brace and the attachment of the blade track segment.

15. The turbine shroud segment of claim 10, wherein the attachment of the blade track segment has a T-shape when viewed in a circumferential direction with a stem that extends radially outward from the runner and an attachment panel that extends axially forward and aft from the stem such that the entire blade track segment has a generally I-beam shape when viewed in the circumferential direction.

16. The turbine shroud segment of claim 15, wherein the plurality of clamps each form a C-shape when viewed in cross-section about the central axis.

17. The turbine shroud segment of claim 15, wherein the plurality of clamps each include a first radial-stop panel positioned radially outward of the bracket, an axial-stop panel that extends radially-inwardly from the first radial-stop panel, and a second radial-stop panel that extends axially from the corresponding axial-stop panel opposite the first radial-stop panel.

18. The turbine shroud segment of claim 17, wherein the plurality of clamps each further include engagement pads that extend radially away from one of the first radial-stop panel and the second radial-stop panel and engage the attachment of the blade track segment.

19. A method comprising providing a carrier segment, a blade track segment, and a mounting system configured to couple the blade track segment to the carrier segment, the blade track segment including a runner shaped to extend partway around a central axis and an attachment that extends radially outward from the runner, and the mounting system including (i) a brace having a bracket and a plurality of shafts that extend radially from the bracket, (ii) a first clamp, and (iii) a second clamp, engaging the bracket of the brace with a radially-outwardly facing surface of the attachment so that the plurality of shafts extend radially away from the attachment of the blade track segment, coupling the first clamp with the bracket of the brace and the attachment of the blade track segment on a first side of the bracket, coupling the second clamp with the bracket of the brace and the attachment of the blade track segment on a second side of the bracket opposite the first side, inserting each of the plurality of shafts through holes formed in the carrier segment, coupling the plurality of shafts to the carrier segment to engage locating pads formed on the bracket of the brace with a radially-inwardly facing surface of the carrier segment so that the locating pads radially locate the blade track segment.

20. The method of claim 19, wherein the first clamp and the second clamp are interference fit with the bracket of the brace and the attachment of the blade track segment.

* * * * *